United States Patent
Cocca (10) Patent No.: US 8,066,450 B2
(45) Date of Patent: Nov. 29, 2011

(54) DEVICE AND METHOD FOR THE TOWING OF UNDERWATER PIPELINES

(75) Inventor: Christian Cocca, Milan (IT)

(73) Assignee: Saipem S.p.A., San Donato Milanese (IT)

(*) Notice: Subject to any disclaimer, the term of this patent is extended or adjusted under 35 U.S.C. 154(b) by 69 days.

(21) Appl. No.: 12/376,884

(22) PCT Filed: Aug. 7, 2007

(86) PCT No.: PCT/EP2007/006996
§ 371 (c)(1),
(2), (4) Date: Apr. 16, 2009

(87) PCT Pub. No.: WO2008/017463
PCT Pub. Date: Feb. 14, 2008

(65) Prior Publication Data
US 2010/0166501 A1 Jul. 1, 2010

(30) Foreign Application Priority Data
Aug. 10, 2006 (IT) .............................. MI2006A1611

(51) Int. Cl.
*F16L 1/16* (2006.01)
(52) U.S. Cl. ........................................ 405/171; 405/158
(58) Field of Classification Search .................. 405/158, 405/159, 160, 161, 162, 164, 171
See application file for complete search history.

(56) References Cited

U.S. PATENT DOCUMENTS

| 4,011,729 | A | * | 3/1977 | Kermel | 405/158 |
| 4,037,425 | A | * | 7/1977 | Berg | 405/200 |
| 4,117,689 | A | * | 10/1978 | Martin | 405/163 |
| 4,121,529 | A | * | 10/1978 | Smith et al. | 405/171 |
| 4,138,853 | A | | 2/1979 | Lamy | |
| 4,183,697 | A | * | 1/1980 | Lamy | 405/171 |
| 4,586,850 | A | * | 5/1986 | Norman et al. | 405/162 |
| 5,518,340 | A | * | 5/1996 | Hall et al. | 405/158 |
| 5,639,185 | A | * | 6/1997 | Saxon | 405/162 |
| 6,837,653 | B1 | | 1/2005 | Grinsted | |

FOREIGN PATENT DOCUMENTS

WO 01 21900 3/2001
WO 2006 045357 5/2006

* cited by examiner

*Primary Examiner* — Frederick L Lagman
(74) *Attorney, Agent, or Firm* — Oblon, Spivak, McClelland, Maier & Neustadt, L.L.P.

(57) ABSTRACT

Device and method for the towing of underwater pipelines (1) comprising the removable connection of a series of devices (101) to the pipeline, positioned at a suitable distance from each other, said devices being capable of providing a float buoyancy to the pipeline which varies according to the distance from the sea bed so that said pipeline can establish a substantially stable attitude at a fixed distance from the bottom, without dragging and with a neutral weight, and wherein said devices form a guide by means of at least one element (5) embedded in the sea floor in order to oppose side stress and impart variations in the direction of the movement of the pipeline.

18 Claims, 6 Drawing Sheets

Fig. 4

DEVICE AND METHOD FOR THE TOWING OF UNDERWATER PIPELINES

The present invention relates to a method and device for the towing of underwater pipelines. More specifically, the invention relates to pipe-laying either in very deep or shallow water, in areas subjected to currents, by the towing of said pipelines close to the sea-bottom (off-bottom tow).

The use of methods and relative equipment for the formation of sections of underwater pipelines by the towing of prefabricated "strings" of pipe from the production site to the final destination, is known in the oil industry.

Among the various possible methods, the so-called "off-bottom tow" should be considered as being the most widely-used. The pipeline is towed by moving it slightly above the seabed. Although this technology is presently used, it has various drawbacks, among which the fact that, in the presence of transversal water streams, the pipeline can be moved off course. Some solutions are proposed in the international patent application (PCT) published on Apr. 5, 2006 with the number WO2006/045357 (U. Giovannini et al.) and a technique is specifically claimed which is based on a geometrical control of the configuration of pipelines with respect to the sea bottom and not to the depth, by means of equipment, connected to the pipeline, substantially containing floats, of which at least a part with a variable or partially variable buoyancy, which, when placed in a pre-established position and at pre-established intervals, provide a graded buoyancy to the pipeline in relation to the distance from the bed in order to obtain a "festoon" configuration of the pipeline, i.e. with suspended sections of pipeline, in correspondence with the floats, alternating with resting sections.

The same off-bottom hauling technique was proposed, as mentioned in the cited PCT patent application, in U.S. Pat. No. 4,138,853 (J. E. Lamy) extended in Italy with the number 1085995, which, in order to oppose the action of the transversal current, proposes the use of a device, according to various embodiments, having deformable resting means on the vertical plane, but transversally rigid.

The solutions proposed by Giovannini and Lamy have various drawbacks. The first, in fact, controls the buoyancy of the floats with respect to the sea bed, but relies, for maintaining the position on route, on a pipeline/sea bed friction force sufficient for opposing the force of the transversal current. This approach is not without risks, due to the uncertainty, for its very nature, of this friction. The Lamy solution, on the other hand, has, in a complementary manner, an approach aimed at contrasting the current buoyancy, but does not provide for a specific control of the residual weight of the pipeline according to its distance from the sea bottom, with the risk that, when the operative conditions vary, it becomes impossible to effectively control the pipeline attitude during towing, as well as the residual weight force which its resting means release on the sea bed, with the risk of encountering considerable resistance to the forward movement. Neither of the techniques envisage any device or method for bringing the towed pipeline back into position, if this has been diverted by the current (for example in the case of particularly intense adverse meteo-marine events) or when it is necessary to change the route of the towed string (for example, to provide a curvature).

The solution we have advantageously found solves these drawbacks and consists of a device and method for towing underwater pipelines in which the functions of the control of the vertical and horizontal attitude are integrated by the action of variable or partially variable buoyancy floats and guiding elements which—by interacting with the seabed by means of a partial penetration of a substantially vertical element whose plane is capable of rotating around a vertical axis, a blade or a disk, for example—are capable of maintaining the towing direction opposing the current force, or changing direction.

The blade, by partially penetrating the seabed, is capable of contrasting the movement perpendicular to its lying plane. At the same time, when said lying plane of the blade is not parallel to the vertical plane passing along the axis of the towed pipeline, the orientation of said blade generates a force system in contact with the ground during towing, capable of varying the movement direction of the pipeline. The above forces are transmitted to the tube by attitude control means, connected, like the floating bodies, to means for the removable connection of the underwater pipeline, for example a supporting structure with release systems, said attitude control means having the function of controlling the blade position and at the same time of operating the buoyancy variation of the floating bodies according to the distance of the pipeline from the sea bottom.

It is possible to infer how to vary the buoyancy of the floating body from the already mentioned known art, in particular Giovannini, who mentions the use of an actuator for discharging the air, whereas at least one nozzle fills the float and means activate and/or position a so-called inlet mouth according to the distance from the sea bed. In the present invention, the so-called means for activating and/or positioning the inlet mouth are provided by the same attitude control means mentioned above.

The problem of determining the buoyancy of the floats is solved by the solution described herein—as only variation margins of the buoyancy are to be determined and not a precise value of the same—as also that relating to the uncertainties caused by the dragging of the pipeline on the seabed, which now moves parallel to the bottom and not in contact with it. Furthermore, the problems of side stability during the towing are also solved and a route correction functionality is added.

The towing device for underwater pipelines, object of the present invention, comprises:
- at least one floating body (2) with a variable or partially variable buoyancy;
- at least one guiding element (5) in contact with the sea bottom, substantially lying on a vertical plane and capable of rotating around a vertical axis;
- attitude control means (4) for modifying the buoyancy of said floating body and controlling the position of said guiding element according to the distance of said device from the sea bottom;
- means for the removable connection (3) of said device to the underwater pipeline.

The base of the floating body is preferably at least partially open to act as an "air bell", and is filled with compressed air at environment pressure.

The guiding element is preferably produced with a disk or a blade.

The guiding element is preferably oriented in several directions, possibly at a pre-established pitch. More preferably the guiding element can be blocked in an established position.

In the invention described herein, the attitude control means preferably include a kinematic mechanism with levers for the control of the position of the guiding element. Said levers preferably also control the buoyancy of the floating bodies. Even more preferably, said levers include a pantograph.

The means for the removable connection with the pipeline preferably include a substantially flat supporting structure and release systems of said structure from the pipeline. More preferably, said structure consists of a frame at least partially of steel carpentry.

The release systems are known to technical experts, they can be produced for example by means of bands, chains, ropes or clamping means which embrace the pipeline and which are released by means of a mechanism, or simply cut, or unhooked by the release of removing screws, pins, etc.

A further object of the invention relates to a method for towing underwater pipelines which can make use of the device described above, said method being characterized by the following steps:

connection to the pipeline of a series of devices, at a suitable distance from each other, said devices being capable of imparting a floating buoyancy to the pipeline in a variable manner according to the distance from the sea bottom and which is such that the pipeline can establish a substantially stable attitude at a fixed distance from the bottom, without dragging and a with neutral weight, and wherein said devices provide a guide by means of at least one element embedded in the seafloor in order to contrast side stress and impart variations in the movement direction of the pipeline.

generation of buoyancys to the pipeline by the activation of said devices;

towing of the pipeline in a longitudinal direction by suitable towing means;

possible variation in the movement direction of the pipeline, by the activation of said devices;

possible release of the pipeline from said devices.

With the method described above, it is possible to obtain all the advantages specified before. It is therefore possible to effect towing operations of underwater pipelines even under difficult conditions, for example in the presence of strong currents, or in shallow water, in the presence of strong winds and wave-motion. The method also allows towing operations to be effected in successive time phases, by positioning the pipeline, when necessary, on the bottom by nullifying the buoyancy, then restarting the towing operation.

The hauling means for towing the pipeline are known and can be provided by means of ropes connected to at least one tug or to a series of floating means or at least one amphibious means or with onshore towing equipment (for example a windlass) or a fixed platform.

The figures which illustrate some embodiment examples of the invention are briefly described hereunder.

For the sake of convenience, the elements which form the device are always shown, even when immersed in the sea-bottom.

A few project indications and an embodiment example of the device in a form according to the claims and with reference to the figures are described hereunder. A description of a towing operation of an underwater pipeline, using the method claimed, is also provided.

Figure 1:
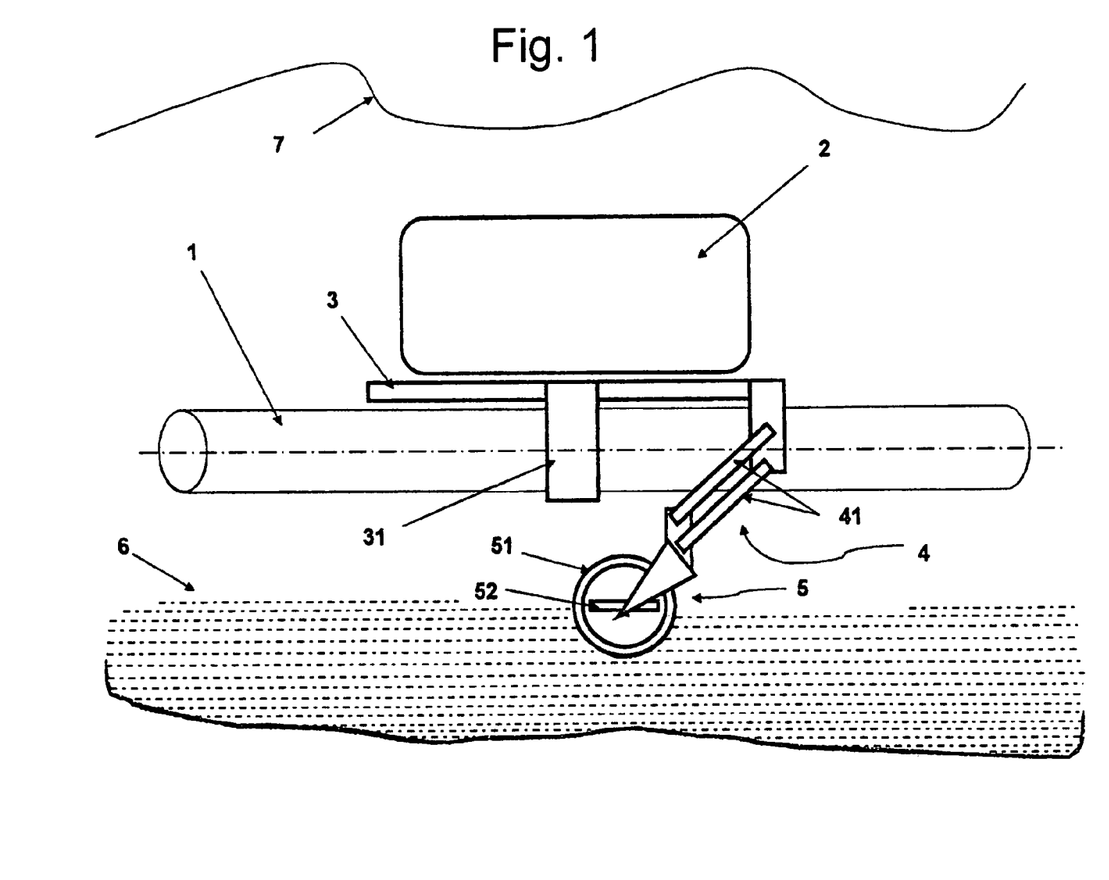
FIG. 1, shows an example of the claimed device, in a lateral view, in the plane of the longitudinal axis of the pipeline (1), including a floating body with a variable or partially variable buoyancy (2), means for the removable connection of the device to the pipeline (1), attitude control means (4), a guiding element (5). The seabed (6) and the sea surface (7) are also shown.
Figure 2:
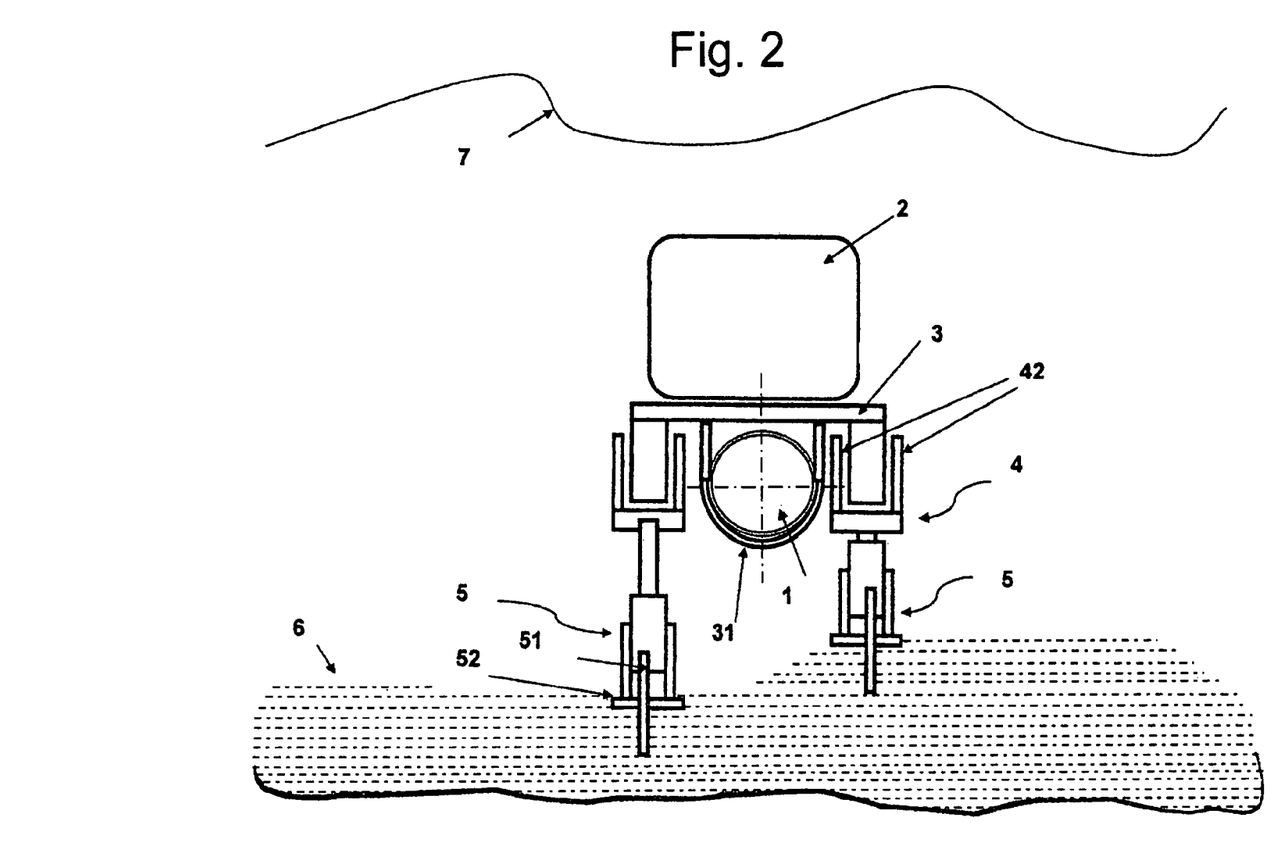
FIG. 2 shows the same device, reproduced with a front view, in an orthogonal plane to the main plane of pipeline (1) whereas, due to the configuration of the seafloor-bottom, the guiding elements (5) rest at different sea-levels.
Figure 3:
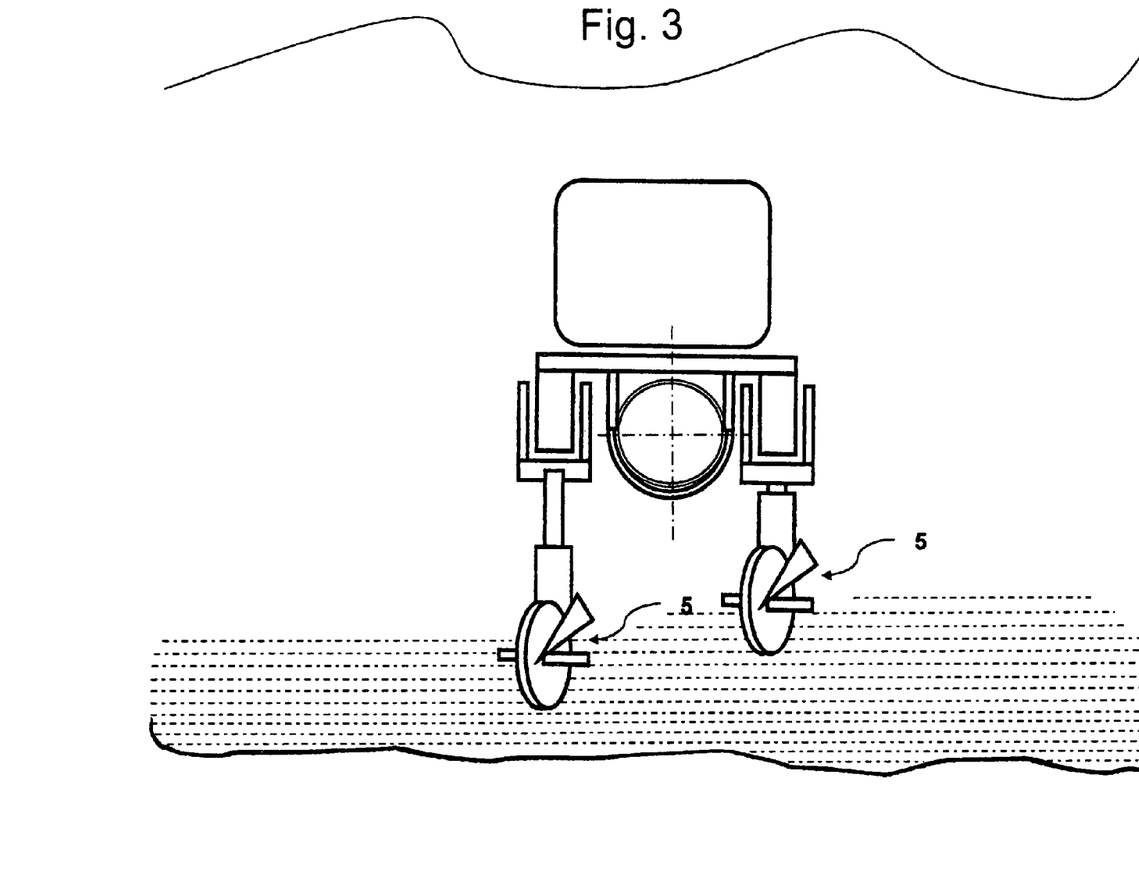
FIG. 3 represents the same view as FIG. 2, but with a different configuration of the device, wherein the guiding element (5) is rotated with respect to the main plane of the pipeline (1).
Figure 4:
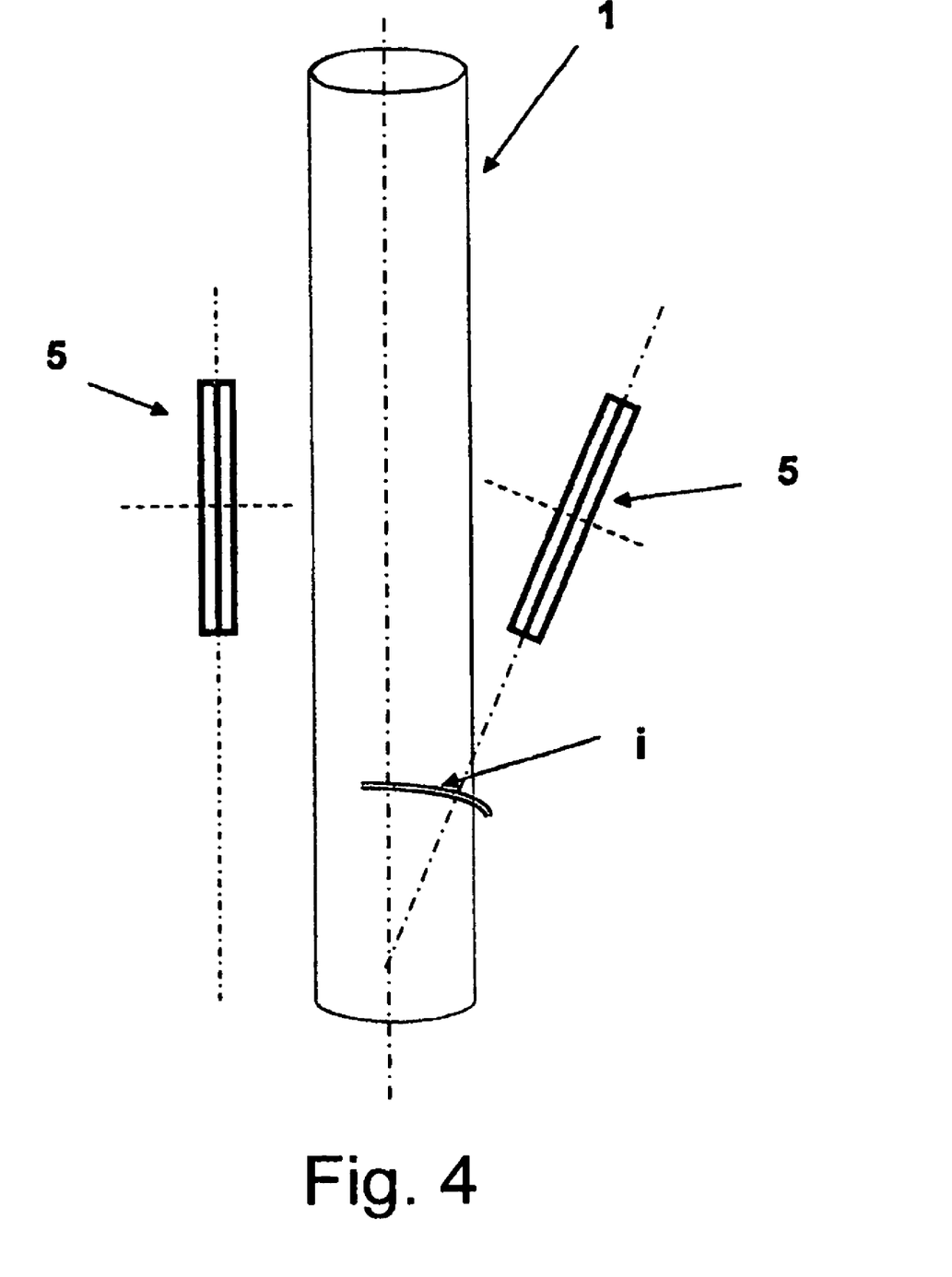
FIG. 4 shows a plan view of the pipeline (1) and two different orientations of the guiding element (5).

The floating body (2) can be of various forms, for example substantially cylindrical or prismatic, with a vertical or horizontal main axis, according to the specific characteristics of use (for example, towing in deep water, shallow water, mixed water; sea bottom configuration uniform or particularly undulating; uncertainties on the characteristics of the pipeline to be towed). In very shallow water particularly flat forms are more suitable, whereas in extremely irregular sea beds or in the case of uncertainty, for example with respect to the weight of the pipeline, it is better to have a large regulation range of the buoyancy and therefore a vertical development of the floating body. In the most common cases, the floating body has a horizontal main axis, as in the example in the figure. The volume and number of floating bodies also depend on the boundary conditions and the pipeline characteristics. It is normally advantageous to fractionate the floating bodies in order to avoid excessive dimensions which would lead to construction, transportation and management problems. The floating body has a rigid or semi-rigid structure and is made of various materials, for example steel, stainless steel, and plastic or composite materials, such as polyurethane, polyethylene and glass-resin. The floating buoyancy is accomplished by maintaining air inside the floating body. The variation of the buoyancy, complete or partial, is effected by modifying the amount of air inside the floating body, or by completely or partially filling or emptying the floating body with water. Experts in the field know how to effect this variation, also called ballasting: for example, by operating with a closed floating body, water can be introduced through a suitable inlet to flood the floating body, allowing air to be discharged from another outlet and, on the contrary, water can be sucked from the floating body, or compressed air introduced to empty it. It is particularly suitable however to operate with a floating body open at its bottom and acting as an air bell. In this way, it is sufficient to pump air or to release it into the environment, with advantages of simplicity and fewer requirements relating to the structure of the floating body, which is not a pressurized recipient.

The floating body is connected to the pipeline by means of the removable connecting means (3). Their position with respect to the pipeline depends on the specific use: the floating body can be assembled above the pipeline or alongside (in the case, for example, of shallow water). In the example illustrated in the figure, said floating body is assembled above the pipeline and above the removable connection means. The removable connection means of the device with the pipeline can be produced by a simple frame connected to the pipe by means of removable connections. The frame can keep the floating bodies together and support the attitude control means (4). Said frame generally has a flat carpentry structure, for example made of steel or stainless steel or aluminium, and comprises clamps, ropes or bands (31) connected to the pipeline to transfer the float buoyancy. The frame must be able to resist the stress transmitted by the guiding element and must therefore be made transversally rigid. It can be assembled below or above the floating body. The contact with the frame can be effected by means of saddles or suitably shaped supports, for example with a circumference arc, and/or with punctual connecting means of a suitable material (for ex. plastic material, rubber, fabric or wood), in order to avoid damage of the external surface of the pipeline. The releasing of the means for the removable connection, known per se, can be effected, for example, by cutting the rope, by the mechanical opening of simple clamping mechanisms (for ex. sliphook releases), by the actuation, for example, of suitable actuators with compressed air, by the release of connecting means such as screws or pins. In some simple cases (for example a floating body consisting of a single element; small-diameter pipelines; small buoyancy variation ranges) the frame can be absent and the means for the removable connection can be extremely compact and substantially integrated or integratable with the floating body, which, at this point, must have a reinforced structure (self-supporting or with a structural frame).

Figure 5:
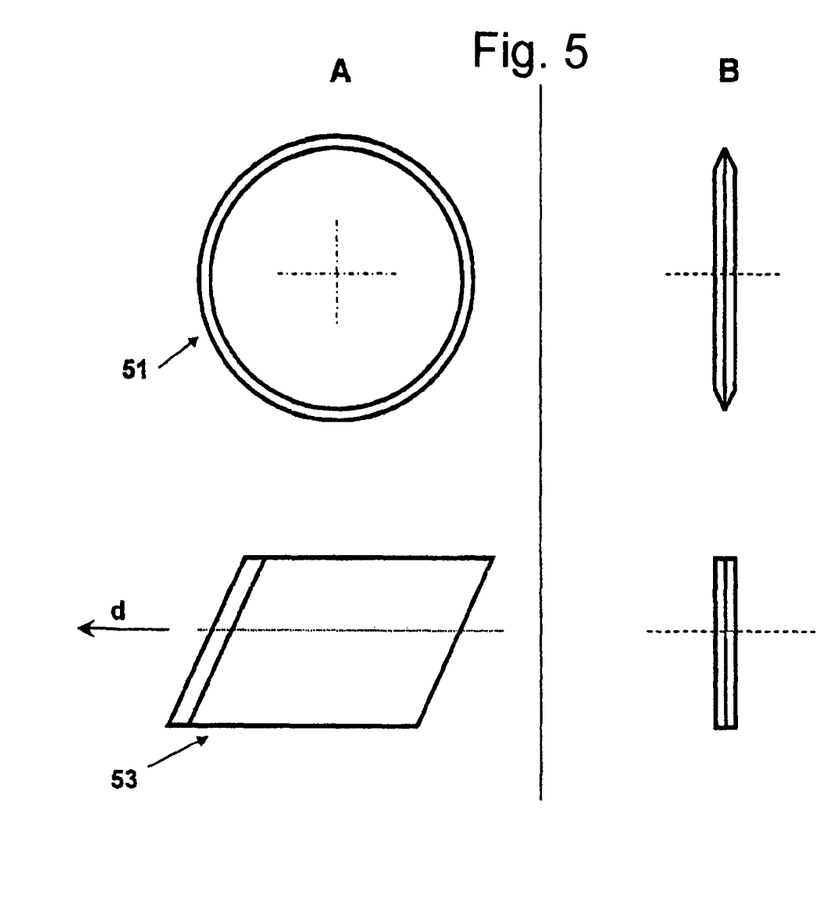
FIG. 5 shows two different examples of blades (51) and (53) on two views, a side-view in the vertical plane A, B a front view.
Figure 6:
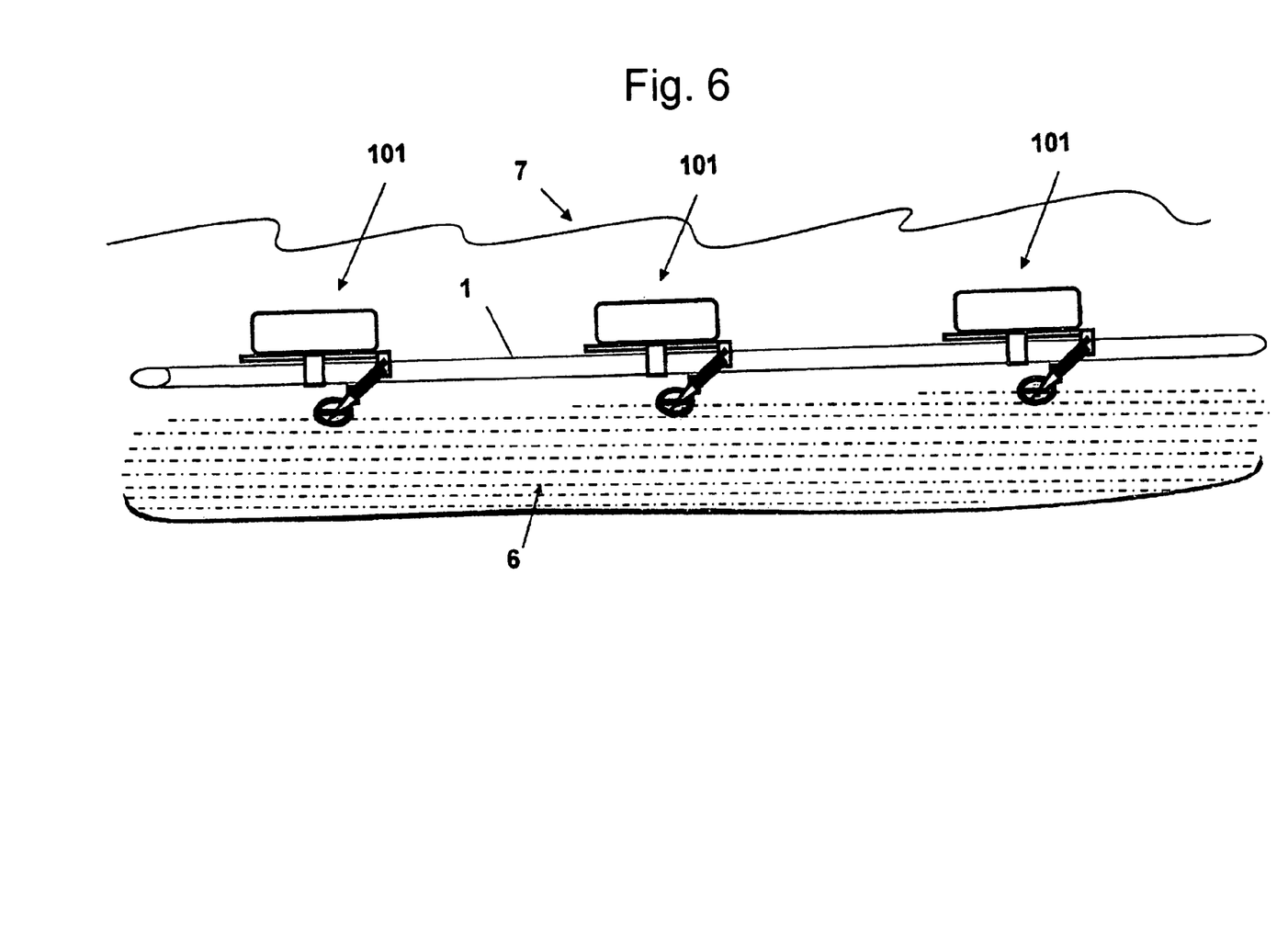
FIG. 6 shows an example of a pipeline (1) equipped with the device claimed (101).

The guiding element (5) has an important function. The forces deriving from transversal stress on the towed pipeline (and on the device claimed herein) are discharged thereon and, thanks to this, the route of the towed pipeline can be corrected. This function is effected, for example, by a blade (51) lying on a vertical plane. As the blade is partially immersed in the ground, it moves with a low resistance in a longitudinal direction, whereas it offers a high transversal resistance. In order to make this resistance active, it is necessary, in relation to the ground, for the blade to penetrate a layer of the ground with a sufficient consistency: sometimes, due to the presence of mud on the surface of the seabed, it is possible to penetrate for several centimetres, up to a meter, or even more. The blade can be produced with a plate (53), for example metallic, suitably shaped, rectangular or polygonal, or polygonal connected by means of curved sections, and it can have an incidence angle which is such that the front connection edge, in the movement direction (d), shown by the arrow in FIG. 5, has an angle on the horizontal plane lower than 90°. The edges of the plate can be sharpened to allow better longitudinal penetration. The blade can be suitably circular, like a disk, possibly free to rotate, like the example in FIG. 51). In order to avoid an excessive penetration in particularly soft seabeds, a flat supporting element (52) can be installed on an orthogonal plane with respect to the plane of the blade, for example in correspondence with the centre of the blade, or on a higher level. Other configurations can comprise guiding elements not with a simple blade but with a multiple blade (blades with parallel planes) or shaped elements in the horizontal plane, in addition to the vertical plane. Even if, in its simplest configuration, there is normally only one guiding element, it is preferable, in order to maximize the effects, to have at least two guiding elements situated in parallel, side-by-side, or in series, one in front of the other. The lying plane of the guiding system is normally parallel to the vertical plane containing the axis of the pipeline. In this case, during towing, the route to be followed and the axis of the pipeline coincide and the guiding element contrasts transversal actions. Said lying plane of the guiding system (5) can be different, forming an angle with the vertical plane of the pipeline axis (1), called incidence angle (i). In the latter case, the system operates as a drift and, thanks to the reaction of the seabed, during towing the route can have a direction, with respect to the pipeline axis, substantially parallel to said incidence angle. This rotation can be obtained in various ways. The incidence angle (i), for example, can be established at the beginning of the operations and is therefore sufficient for preparing a perforated horizontal plate for the assembly of the guiding element, so that the incidence angle can be easily changed by rotating the coupling of one or more pitches, said pitches consisting of the distance between the assembly holes. If a regulation is also needed during operations, the incidence angle can be varied by assembling a rotation mechanism (for example with gears) which can be locally activated by scuba divers, robot vehicles (ROV) or directly from the surface, in the case of shallow water (through the use of a driving shaft). The mechanisms can move the incidence angle at pre-established pitches or in continuous. This adjustment during operations can also be activated by remote control, using actuators (for example of the pneumatic type) operated at a distance and suitably instrumented (for example with compasses and encoders).

The attitude control means (4) act on the floating body to modify its buoyancy according to the distance from the seabed and on the guiding element to control its vertical position. The regulation of the buoyancy and the control of the filling or emptying of the floating body according to the distance form the sea bed, is a known technique. Control valves can be used, for example, for the admission/expulsion of air/water actuated by the measurement effected by an acoustic altimeter. Or, as disclosed by Giovannini, a mechanical actuator can be considered which, on the one hand is in contact with the seabed and, on the other, activates an outlet air mouth and a nozzle for the inlet of air. The position of the guiding element can be controlled by means of a kinematic mechanism with levers which guides said element so that it remains in contact with the seabed in the right attitude and is capable of transmitting forces. Rotation kinematics are extremely favourable. In particular, a kinematic mechanism with a pantograph (41) like in the example in the figure, allows the attitude to be controlled and strong stress to be resisted when sufficiently strengthened also in the transversal plane, for example by assembling fork terminal units (42) as in the example. The same mechanism connected to the guiding element, can exert the function of buoyancy variation in an integrated manner. If different guiding elements are used, their relative attitude control means can be mechanically connected in order to assure a higher structural rigidity, or to associate the regulation of the incidence angle (i) of the guiding element and also the buoyancy regulation.

Towing operations of a pipeline are normally effected using a series of equipment and supporting means and require an accurate organization and planning of the activities. Said operations are made more complex by the different environmental conditions in which they are effected, in particular relating to the characteristics of the pipeline itself, i.e. the diameter, thickness, possible weight coating, the length of the pipeline (typically from a few hundred meters to 1 Km and over and up to lengths of 5 km), the depth and nature of the seabed, exposure to meteo-marine events (protected areas or open sea; calm or particularly agitated sea; the presence of ice and considerable seasonal phenomena) and uncertainties relating to the pipeline characteristics (for example the real weight) and the meteo-marine conditions during the operations. A further element is the precision required for the installation (precision in the laying corridor) and the final position of the head and tail of the towed string. According to the method claimed, the operations are effected by preparing the string of pipes (pipeline) for towing by connection with a series of devices such as those claimed, suitably dimensioned according to the weight of the pipeline and installation inter-axis of said devices. The selection of the number, buoyancy capacity (and therefore of the interaxis) is a compromise which must take into consideration, on the one hand, the production requirements associated with the construction of the devices and, on the other hand, the operating conditions of use (manageability, surface exposed to the current, etc.). The aim is to make the pipeline neutral (substantially zero weight in water) and therefore the total buoyancy of the devices must be equal to the weight of the pipeline in water. The uncertainties are compensated by varying the buoyancy according to the distance from the seabed. The buoyancy of a single floating body, for example, could range from 1,000 to 5,000 kg, whereas the typical interaxis could range from 24 to 72 meters. The variation could relate to the percentage of that buoyancy, for example between 10 and 30%, with a distance from the seabed of between half a meter and two meters. Short interaxes between the devices lead to higher installation times, long interaxes require floating bodies having large dimensions, also because the span formed by the pipeline must be calculated, both on a vertical and horizontal plane, as dragging on the seabed must be avoided. The connection to the pipeline of said devices is effected in the most convenient place and moment. For example, if the string is pre-assembled onshore, the devices can be assembled during the construction, or during the launching of the string in water, but still installed onshore, for example on the shore-line. The string can be assembled on a pontoon: in, this case the devices could be assembled on board. The devices are assembled after being prepared both with respect to the variation in the buoyancy with respect to the sea bottom, by suitably regulating the relative attitude control means, and also with respect to the incidence angle of the guiding element. The entire system is therefore prepared so that the pipeline can proceed, during towing, substantially stable on the vertical plane, at a fixed distance from the seabed, without dragging and with neutral weight, also guided on the horizontal plane, thanks to the guiding elements of the devices. After the initial launching, the pipeline can be left on the seabed in order to guarantee its stability, and then, at the most suitable moment (according to the project requirements or due to favourable meteo-marine conditions) the devices are activated, for example by sending air into the floating bodies. The pipeline is ready to be towed to its destination, which can be effected, for example, by a tug at the head and another at the tail, or by a series of natants placed along the pipeline. In some cases the towing is carried out from a fixed position (onshore, on a platform) or from a moored means in a fixed position, using pulling devices such as winches. Again, in some particular cases (shallow water) amphibious means can be used. During the towing operations, the pipeline is subjected to the action of external forces, such as currents and, in the case of shallow water or particularly shallow water, waves motion and the action of wind and consequently the guiding elements of the devices can be subjected to stress. In the case of exceptional events, it is possible to resort to mooring even in several points along the pipeline, or natants can be used which impart a transversal buoyancy to the pipeline, or the pipeline can be temporarily laid on the sea bed, after flooding the floating bodies. In any case, it may occur that the pipeline is moved to the side, off-route. The same can happen as a result of problems with the tug or its direction errors. The route correction which implies a transversal movement, as also the necessity of bringing the head of the pipeline to a certain point outside the route aligning, is obtained by activating the devices and subsequently the relative guiding element. The correct incidence angle must be established in order to return to the correct route. The correction will be effected by towing the pipeline for a sufficiently long distance, defined by the geometry of the situation and by empirical considerations in situ, which consider a certain leeway due to the failure of ground, which leads to a deviation between the rigid theoretical movement due to the incidence angle selected, and the effective transversal shifting obtained. This deviation depends on the nature of the ground. Corrections are possible by changing said incidence angle during operations. Once the towing operations have been completed and the pipeline is in position, it is possible to sink it by flooding after flooding the devices. According to the requirements (whether the stopping site is defined or not) the devices must be released. The operation is carried out with the help of supporting means for the recovery of devices. According to the releasing system used, the operations can be effected with different times and procedures, well-known to experts in the field.

Although the method described can be used independently of the devices claimed, these prove to be particularly suitable for the purpose.

The invention claimed is:

1. A device for towing underwater pipelines, comprising:
    at least one floating body with a variable or partially variable buoyancy;
    at least one guiding element in contact with a sea bottom, substantially lying on a vertical plane and being rotatable around a vertical axis;
    an attitude controller that modifies the buoyancy of said at least one floating body and that controls the position of said at least one guiding element according to a distance of said device from the sea bottom; and
    a removable connection of said device that is connectable to an underwater pipeline.

2. The device according to claim 1, wherein a base of the at least one floating body is partially open.

3. The device according to claim 1 or 2, wherein the at least one guiding element includes a disk or a blade.

4. The device according to claim 1, wherein the at least one guiding element is orientable in several directions.

5. The device according to claim 4, wherein the at least one guiding element is orientable in several directions at a definite pitch.

6. The device according to claim 4, wherein the at least one guiding element is lockable in a definite position.

7. The device according to claim 1, wherein the attitude controller includes a kinematic mechanism with levers to control the position of the at least one guiding element.

8. The device according to claim 7, wherein said levers also control the buoyancy of the at least one floating body.

9. The device according to claim 7, wherein said levers form a pantograph.

10. The device according to claim 1, wherein the removable connection includes a substantially flat supporting structure and a releasing system of said structure from the pipeline.

11. The device according to claim 10, wherein said supporting structure includes a frame at least partially of steel carpentry.

12. The device according to claim 1, wherein the at least one guiding element includes a flat supporting element that is installed on an orthogonal plane with respect to the vertical plane of the at least one guiding element, the flat supporting element reducing penetration of the at least one guiding element into the sea bottom.

13. The device according to claim 1, wherein the at least one guiding element includes at least two guiding elements side-by-side with each other.

14. A method for the towing of underwater pipelines, comprising:
    connecting to a pipeline a series of devices, at a suitable distance from each other, said devices imparting a floating buoyancy to the pipeline in a variable manner according to the distance from a sea bottom such that said pipeline establishes a substantially stable attitude at a fixed distance from the bottom, without dragging and with a neutral weight, and said devices forming a guide by means of at least one guiding element of at least one of the devices that is partially immersed in the sea bottom to counteract side forces and that is rotatable to impart variations in a movement direction of the pipeline;

activating said devices to generate a buoyancy to the pipeline; and towing the pipeline in a longitudinal direction by a tow.

15. The method according to claim 14, further comprising:

activating said at least one of the devices to impart a variation in the movement direction of the pipeline.

16. The method according to claim 14 or 15, further comprising:

releasing said devices from the pipeline.

17. The method according to claim 14, further comprising:

flooding the devices to rest the pipeline on the sea bottom, and wherein one or more sequences of the activating and the towing and the flooding are performed.

18. The method according to claim 14, wherein the connecting to the pipeline the series of devices includes connecting the device according to claim 1.

\* \* \* \* \*